US006617512B2

(12) United States Patent
Roques

(10) Patent No.: US 6,617,512 B2
(45) Date of Patent: Sep. 9, 2003

(54) WALL FEEDTHROUGH

(75) Inventor: Bernard Roques, Thermines (FR)

(73) Assignee: L'Etat Francais, represente par le Delegue General pour l'Armement (FR)

( * ) Notice: Subject to any disclaimer, the term of this patent is extended or adjusted under 35 U.S.C. 154(b) by 0 days.

(21) Appl. No.: 09/987,429

(22) Filed: Nov. 14, 2001

(65) Prior Publication Data

US 2002/0112872 A1 Aug. 22, 2002

(30) Foreign Application Priority Data

Nov. 14, 2000 (FR) ........................................... 00 14594

(51) Int. Cl.[7] ................................................ H02G 3/18
(52) U.S. Cl. .................................... 174/65 R; 439/578
(58) Field of Search ............................ 174/65 R, 65 G, 174/65 SS, 151; 439/578

(56) References Cited

U.S. PATENT DOCUMENTS 3,662,082 A 5/1972 Heppner ..................... 174/18
4,508,797 A * 4/1985 Knoedler et al. ........... 429/184

FOREIGN PATENT DOCUMENTS

DE 38 43 943 A1 6/1990

* cited by examiner

*Primary Examiner*—Renee Luebke
*Assistant Examiner*—Ann McCamey
(74) *Attorney, Agent, or Firm*—Parkhurst & Wendel, L.L.P.

(57) ABSTRACT

The invention relates to a wall feedthrough, in particular for a metal wall and for a high-voltage coaxial cable, said feedthrough comprising an insulating socket which is affixed to the wall and which includes a central segment, an upstream end and a downstream end, said ends each projecting on its side from the wall.

The insulating socket allows passing a cable inner conductor through it, and the feedthrough furthermore includes primary mechanical fasteners at the downstream socket end which cooperate with secondary mechanical fasteners affixed to the sheathed part of the cable.

This feedthrough is characterized in that the cable's inner conductor is electrically insulated from the wall by prestressed electric insulators.

13 Claims, 5 Drawing Sheets

FIG. 7

MEASUREMENTS FOR A K495 SILICONE INSULATOR TO OBTAIN A VOLTAGE BREAKDOWN ON THE ORDER OF 50kV (INSULATOR THICKNESS IS APPROXIMATELY 6.4mm)

| THICKNESS OF INSULATOR (cm) | COMPRESSION RATIO OF INSULATOR (%) |
|---|---|
| 0.6 | 65 |
| 0.8 | 54 |
| 1 | 45 |
| 1.2 | 40 |
| 1.5 | 35 |
| 1.8 | 30 |

WALL FEEDTHROUGH

FIELD OF THE INVENTION

The present invention relates to the technical field of electrical connectors designed for high voltages of the order of 50 kv and even 100 kv (without implying restriction).

BACKGROUND OF THE INVENTION

Industrial applications in this field require cables to cross generally metallic walls, the cables carrying high-voltage currents which furthermore may be high-current pulses, (for instance 10,000 amperes) of a width of a microsecond.

A particular problem arises when a transition must be carried out between an insulated coaxial line on one side of the wall to a line which is uninsulated relative to air on the other side of the wall.

Several designs already have been developed in this field.

Conventional products such as those commercially offered by high-voltage connector specialized manufacturers and known under the Trademarks RADIALL$^R$, ALCATEL$^R$, ETAT$^R$, LEYBOLD$^R$, PFFEIFER$^R$, VARIAN$^R$ or VEECO$^R$, which in general consist of a socket affixed to the wall for being hooked to a connector at the end of the coaxial line. To prevent electrical breakdown between the end commonly called the hot point of the line and the metal wall, the connector consists at the air-side line of an insulator shaped in such a corrugated way that the surface distance between these two elements shall be adequate, i.e., increasing the distance between the hot point and the wall allows increasing the paths of the electric paths in case of breakdowns.

Moreover, and obviously as regards the geometry of such aforementioned connectors, they are deprived of shielding around the insulation portion of the air-side line, in order to avoid electrical breakdown. As a result electromagnetic shielding stops where the coaxial cable is hooked up to the socket.

Another design creates dielectric continuity by inserting grease or oil between the socket's insulator and the metal wall in order to enhance dielectric strength while averting any air pocket between these various elements. As a result surface breakdowns take place at the insulators' joint and along them are minimized because the air pockets between the various materials were eliminated. The maximum increase in voltage strength attained in such manner however is only 20%.

On the other hand the practical implementation of these electric insulation procedures incurs many drawbacks, in particular when connectors shall service high voltage generators and especially when such generators shall generate narrow pulses.

The shape effect of the socket insulators most often entails bulk. The substantially bulky insulators of these sockets entail excessive inductance that may degrade the performance of such high-voltage generators.

The lack of shielding of the insulating part of the air-side liner is especially problematic when transmitting current pulses with steep leading edges because a significant length of unshielded line with voltage applied to it entails back emf's hampering the currents at high frequencies. The losses caused by the back emf's in such cases may render conventional connectors impractical.

Again a number of drawbacks are incurred when using oil or grease impregnated insulating materials: if the temperature is too low, some oils will gel or crystallize. Also high currents which generate electric arcing between the conductors and micro-discharges near the dielectrics will pollute the oil films, in particular by catalyzing some oil hydrolysis. Once they acquire moisture, the greases and oils lose dielectric strength. Again all these designs are bulky and cannot be used with small generators.

The objective of the invention is palliation by creating a wall feedthrough preserving shielding protection as far as the transit through the wall, the feedthrough part which emerges beyond the wall being small (usually less than a cm even for voltages of about 100 kv).

Another objective of the present invention is a hookup device for high-voltage cables and designed on the same principles as the wall feedthrough.

Accordingly, the objective of the present invention is a wall feedthrough in particular for a metal wall and for a high-voltage coaxial cable, the feedthrough comprising an insulating socket affixed to the wall. This socket exhibits an upstream end (conventionally denoting the side of air-side transmission line) and a downstream end (conventionally denoting the side of the insulated transmission line), each end projecting from its side of the wall, the inner cable conductor being continuously passing through the insulating socket. This feedthrough also includes primary mechanical fasteners which shall cooperate with secondary mechanical fasteners affixed to the cables sheath.

SUMMARY OF THE INVENTION

This feedthrough is characterized in that, at the wall crossing, the inner cable conductor is electrically insulated from the wall by compressed electric insulators.

The compression of the electric insulators preferably shall be at least 30%.

The compressed electric insulators are situated between the upstream end issuing from the insulating socket and the wall and, at the center of the insulating socket, between the cable inner conductor and the insulating socket.

This wall feedthrough may be fitted with a thin insulating film covering the metal wall on the upstream side of the insulating socket.

In a preferred embodiment mode, the upstream end issuing from the insulating socket includes a flange receiving a part of the electric insulators.

The primary mechanical fasteners include a metal case which, by means of primary elements such as nuts, can be affixed to the downstream end of the insulating socket, and which may receive secondary elements such as nuts that shall cooperate with the secondary fasteners.

The primary mechanical fasteners are electrically conducting and may include electrical hookup elements cooperating with the wall. Again the secondary mechanical fasteners are electrically conducting and electrically hooked up to the cable's shielding.

In another preferred embodiment of the invention, the cable's inner conductor cooperates with spherical electrical conductors. This feedthrough comprises compressed insulators for instance made of silicone sponge.

In another embodiment of the invention, its object is a hookup device high-voltage cable that comprises a primary enclosing insulator and a secondary enclosing insulator, these primary and secondary enclosing insulators being respectively mounted on a primary inner conductor of a first cable and on a secondary inner conductor of a second cable. These two inner conductors shall be connected to each other by an electrical hookup element. The primary and secondary enclosing insulators may be respectively clad by primary and secondary shielding extensions which make mutual contact and are mechanically joined together. Such device is characterized in that the primary and secondary inner conductors as well as the electrical hookup element are electrically insulated by compressed electric insulators from the primary and secondary shield extensions. This hookup device making use of compressed insulators offers the advantage of electrically sealing from each other two elements, whether they are conducting or not, by filling all the roughnesses of the boundary surfaces and as a result the breakdowns caused by surface discontinuities can be substantially reduced.

The invention offers another advantage in offering a design whereby, beyond a given compression, surface breakdown vanishes in favor of volume breakdown; in this way compression substantially enhances the insulator's surface dielectric strength.

Another advantage of the present invention is that the technique above is independent of materials selection at the dielectric joint and that it can be adjusted so as to attain the desired voltage strength.

Lastly the design of the invention offers the advantage of substantially lowering the manufacturing costs of the wall feedthroughs in that it reduces the machining that was carried out on the insulators of the prior state of the art.

Moreover the invention may be tailored advantageously to result in a hookup device for high-voltage cables of which the design is based on the same principle as that of the wall feedthrough of which the advantages were cited above.

BRIEF DESCRIPTION OF THE DRAWINGS

Other features and advantages are elucidated in the following detailed and non-restrictive description.

The description relates to the following attached drawings.

FIG. 7 shows a table of test results made on the K495 material of Keeling Rubber & Plastics Ltd for the desired thicknesses of this insulator corresponding to the compression applied to it in order it offer a surface breakdown strength of about 50 kv.

DISCLOSURE OF THE INVENTION

Figures 1, 2:
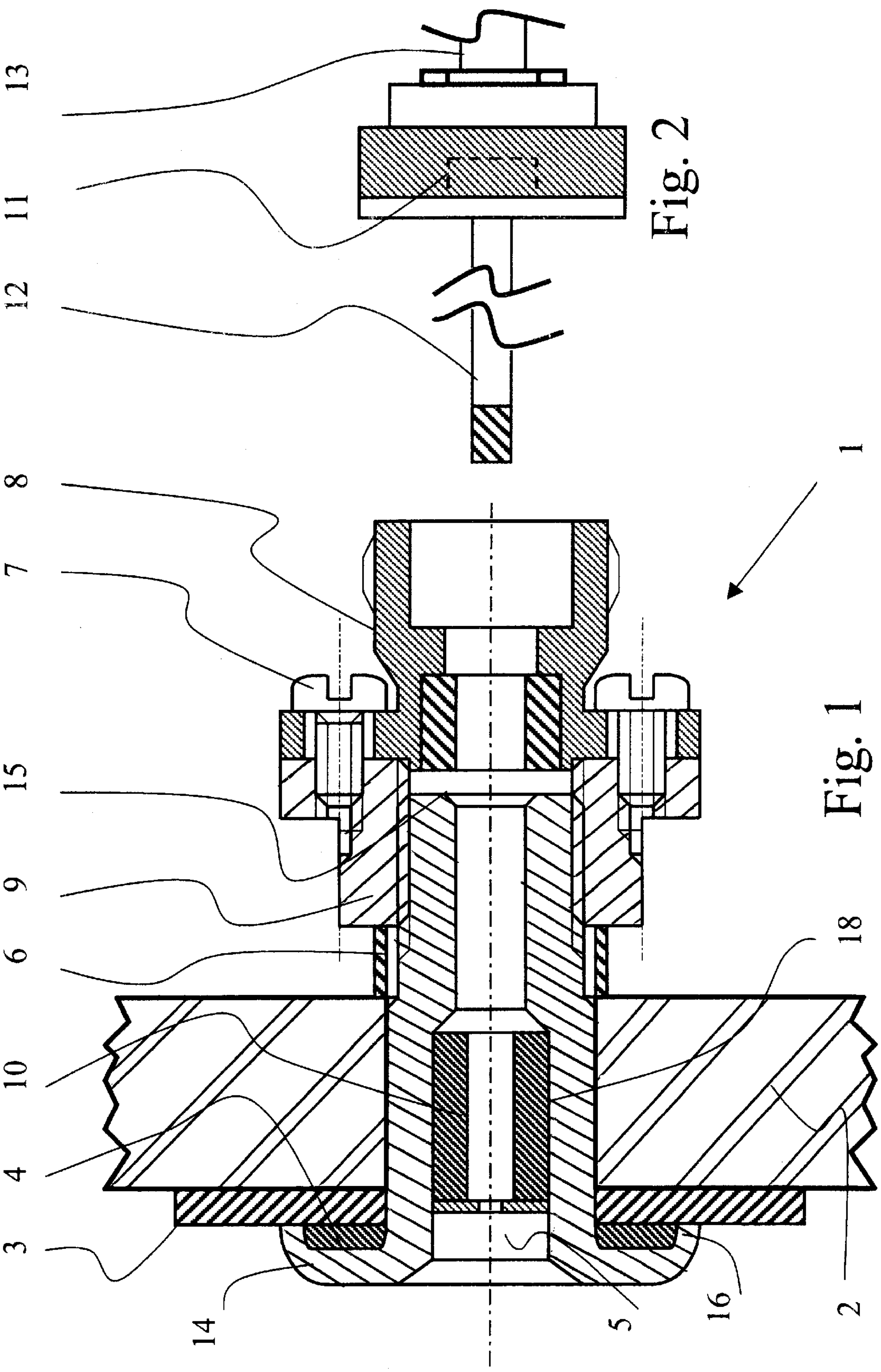
FIG. 1 is a sectional view of the wall feedthrough affixed to a metal wall.
FIG. 2 is a topview of a cable to be inserted into the wall feedthrough.

FIGS. 1 and 2 show a wall feedthrough, in particular for a metal wall, for a high-voltage coaxial cable.

This feedthrough 1 consists of a substantially cylindrical body of revolution constituting an insulating socket 5 comprising three distinct parts. There is a central segment 18 and two ends, one upstream and the other downstream. This feedthrough may be fitted to any wall thickness by inserting if needed a conducting tube. A metal wall 2 receives the insulating socket 5 and exhibits a borehole for that purpose. Once in place, the insulating socket shall be stationary, its central segment 18 then being in the clearance in the wall 2 and its ends projecting outside the wall, its upstream end 14 being situated on the side of the transmission line in air and its downstream end 15 on the other side. The upstream end 14 is fitted with a head allowing the socket to come to rest against the wall 2, whereas the downstream end 15 is cylindrical and its diameter is identical with that of the central segment's. The downstream end is threaded and will seat primary mechanical fastenings 7, 8, 9.

Preferably the primary mechanical fasteners 7, 8, 9 shall be an inside-threaded collar 9 constituting primary elements such as a nut and being screwed onto the downstream end 15, collar 9 furthermore exhibiting two tapped holes whereby—using screws—secondary elements 8 such as nuts may be affixed, such secondary elements cooperating with secondary mechanical fasteners 11 firmly joined to the cable.

Accordingly the above assembled feedthrough shall be crossed by the inner conductor 12 of a cable 13: the cable 13 shall cross this feedthrough without its inner conductor making contact with any other electrically conducting part of this feedthrough. Moreover the insulation of the inner conductor 12 shall be completed at the junction between the wall 2 and the socket's upstream end 14 by means of the compressed insulator 4, and as a result electric arcs are prevented from moving from the hot point constituted by the end of the cable's inner conductor to the wall 2. The insulation of the inner conductor 12 also shall be completed where the compressed insulator 10 passes through the metal wall in the form of a cylindrical stopper 10 to preclude a current path inside and along the segment 18. Were such insulating elements absent, the electric arc might move from the inner conductor end through the inside of the segment 18 to the downstream end 15 and in this manner reach the metal element 9.

These increases in electric insulation are attained by using electric insulators 4, 10 situated at the above sites. They are foremost a washer 4 inserted between the upstream socket end 14 and the wall 2. This washer is made of a compressible material enabling genuine electrical insulation between the upstream end 14 and the wall 2. The end may include a flange 16 to better keep in place the washer, and furthermore to hamper its plastic flow with time. Such a use of especially soft, compressible elements allows making the upstream end 14 very small.

In general it will be necessary to interpose an insulating foil between the wall 2 and the upstream end 14. This foil shall prevent lateral electric breakdowns between the wall 2 and the upstream end 14 of the socket 5.

A cylindrical stopper 10 which is hollow from end to end also is used to implement electrical sealing. This stopper also is compressed within a borehole subtended within the central case 18, and it receives and passes the inner conductor 12 of the cable 13.

Thanks to this feedthrough making use of compressible insulators, the surface formation of electric arcs between the hot point and the wall or the cable shield is wholly eliminated and the inductance is reduced compared to already extant and bulkier systems which are shielded only very partly. Considering the performance of the feedthrough of the invention, insulation no longer need use grease or oil to improve insulation. Be it borne in mind however that the invention operates identically in the presence of oil or grease.

Figure 3:
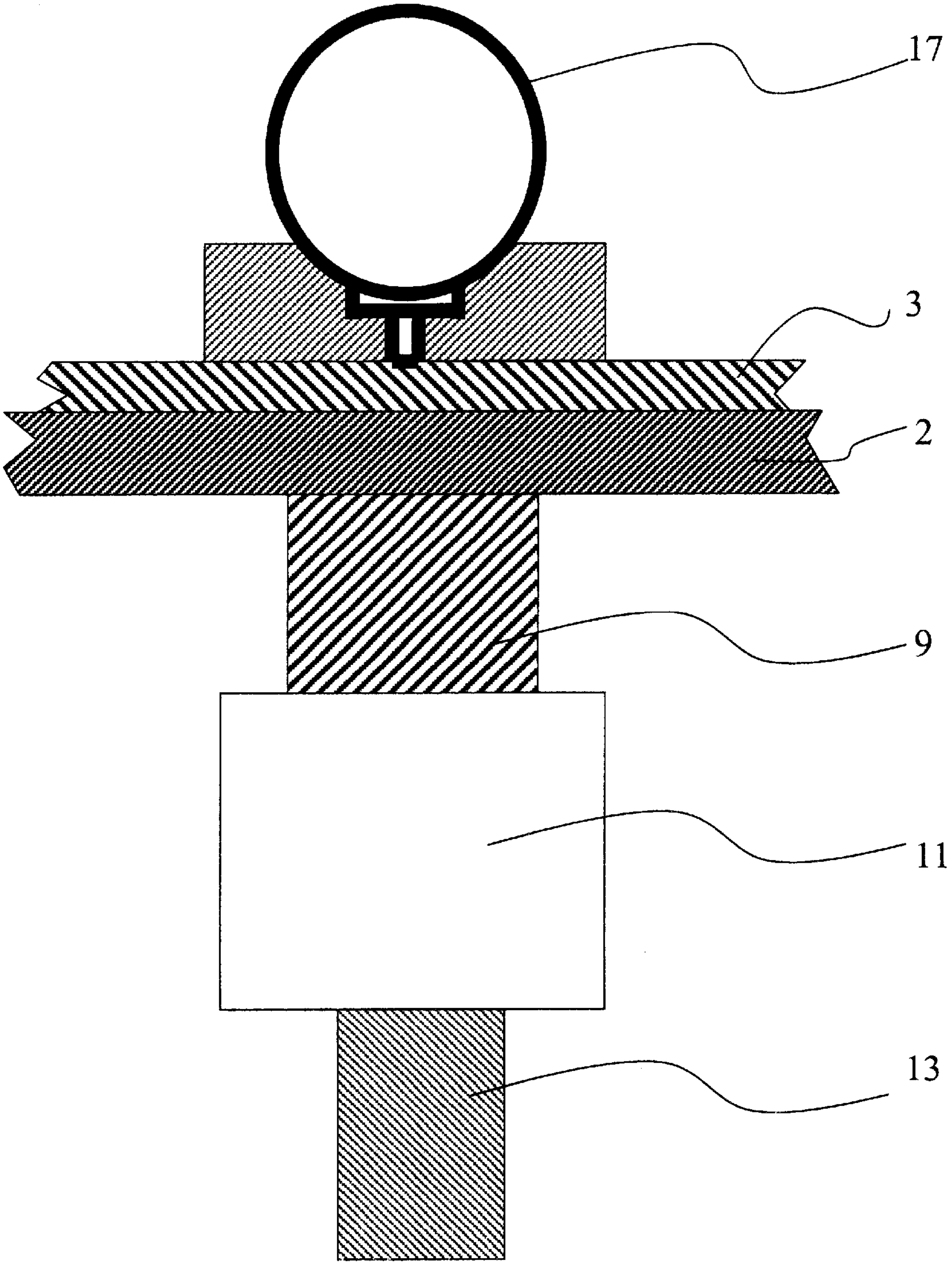
FIG. 3 is a sectional view of the wall feedthrough, the inner cable conductor being connected to a sphere.

The cable consists of two parts. First there is the inner conductor 12 of which the end is situated at the socket's upstream end 14 once this cable has been positioned in this feedthrough, and in the second place there is the sheath which provides shielding around the cable. Be it noted that the inner conductor 12 may be hooked up to a conducting sphere 17 as shown in FIG. 3. As a result the shape factor shall have been improved, hence the electric fields shall be weaker while avoiding tip-discharge effects, hence the hookup device's voltage strength shall be increased.

Moreover the cable is fitted with secondary mechanical fasteners 11 which cooperate with the primary mechanical fasteners 7, 8, 9. The secondary mechanical fasteners are situated at the boundary between the inner conductor and the sheathed cable portion and they are hooked up to the cable's shield. In particular such fasteners comprise a threaded part 11 by means of which the cable can be fastened onto the socket when the part 11 cooperates with the secondary fasteners 8 such as nuts cooperating with the downstream end 15 of the socket 5.

Be it noted that the cable 13 in its sheathed part is fitted with shielding that is electrically connected by the electrically conducting primary and secondary fasteners to the metal wall 2. Electrical hookup elements situated on the primary mechanical fasteners may consist of a metal ring 6 making contact with the wall 2 and thereby implementing contact continuity as far as the shield of the cable 13.

The above described feedthrough applies not only to the transition between a coaxial cable and an air-side transmission line, but also to other electrical components such as spark gaps, high-voltage, low-inductance distribution systems, also hooking together high-voltage cables.

Figure 4:
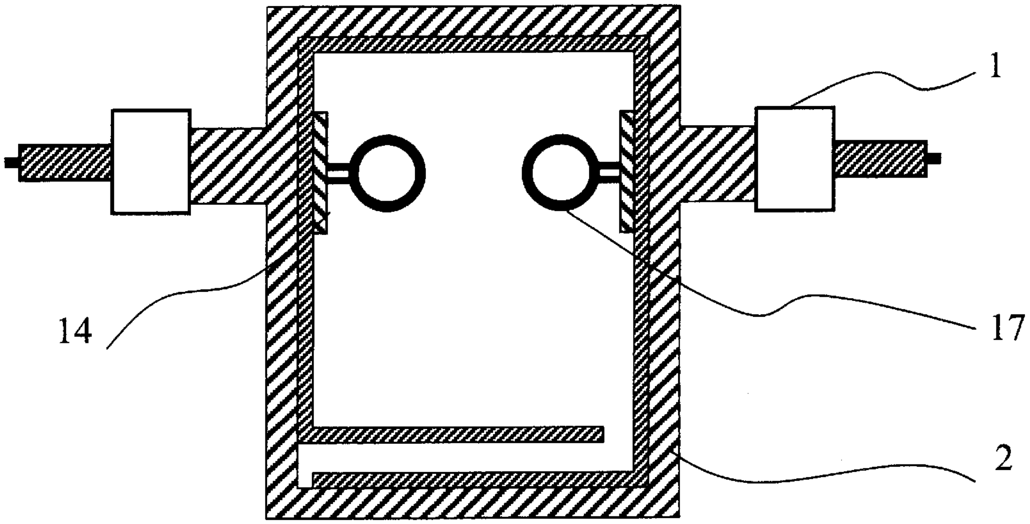
FIG. 4 is a sectional view of the wall feedthrough cooperating with a coaxial-line spark gap.
Figure 5:
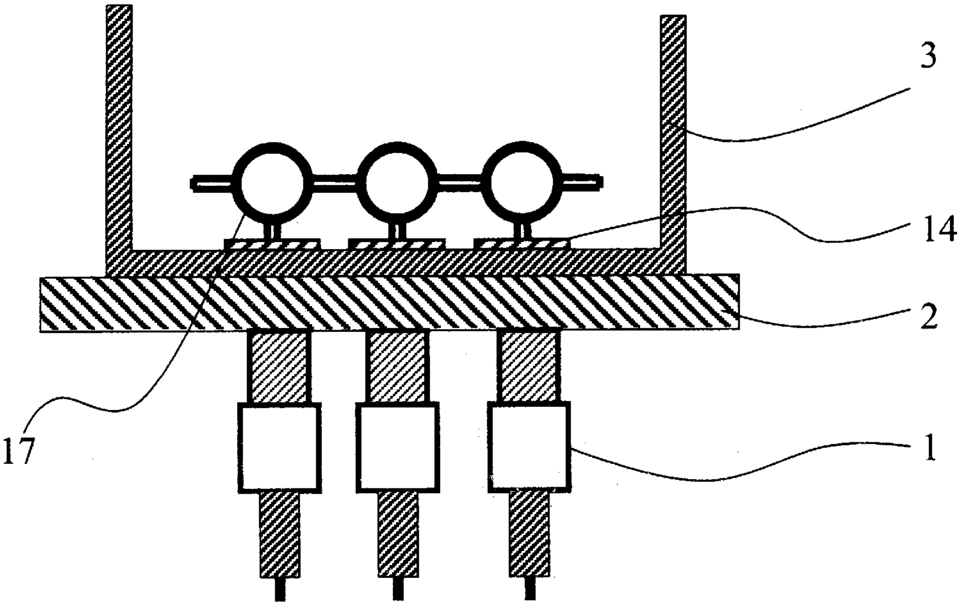
FIG. 5 is a sectional view of the wall feedthrough cooperating with a high-voltage, low-inductance distributor for coaxial cables.

As regards FIG. 4, it relates to a first application of the feedthrough of the invention used in duplicate and constituting an assembly of a coaxial transmission line spark gap. This wall feedthrough also may be used as a high-voltage and high-frequency probe and in carrying out measurements relative to a conducting ground plane. Measurements may be taken virtually at the cable input and hence directly at its characteristic impedance without need to insert an inductance corresponding to the electrical lengths typically required to circumvent breakdowns.

Figure 6:
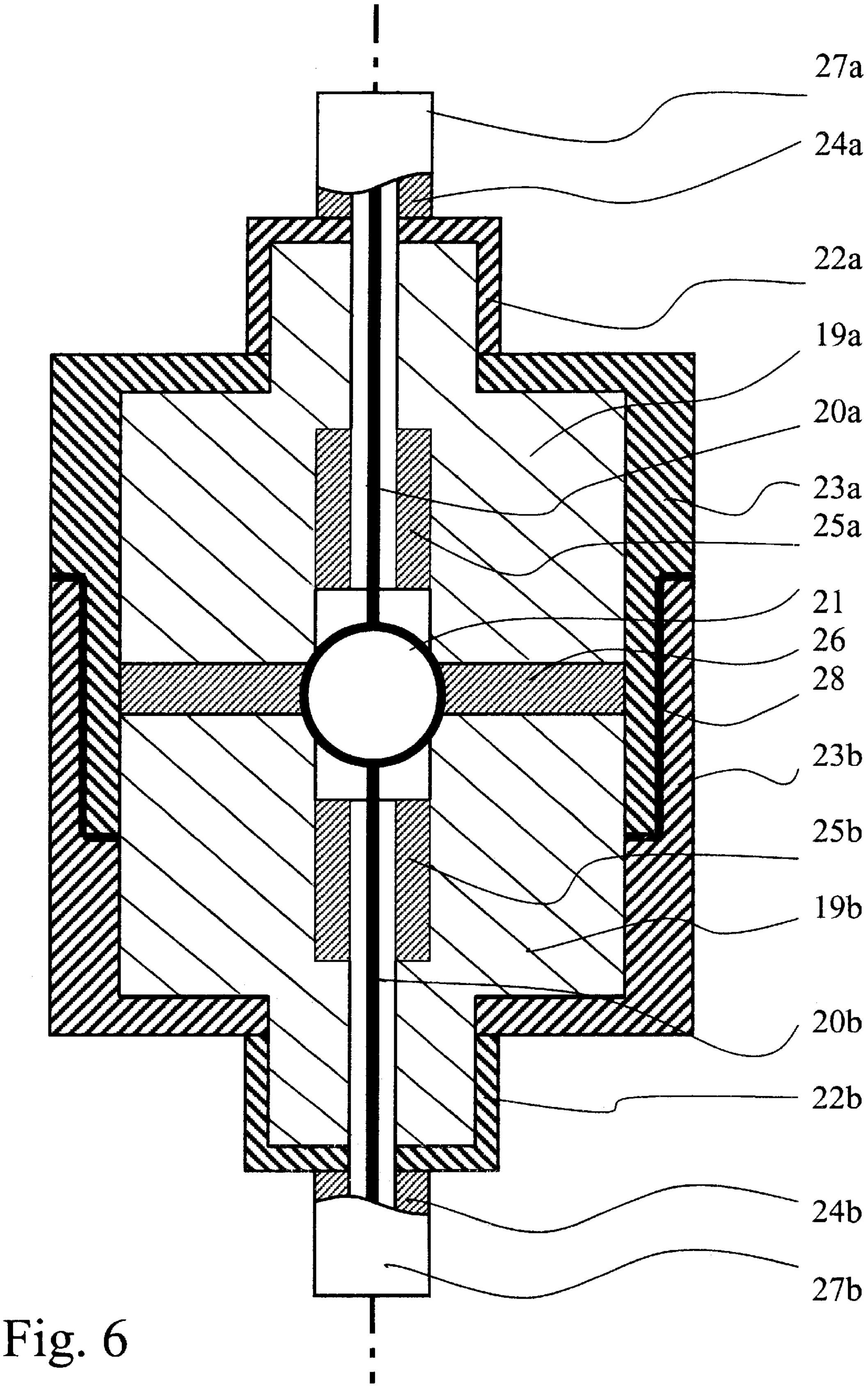
FIG. 6 is a longitudinal section of a hookup device of the invention for high-voltage cables.

As regards FIG. 6, it shows a high-voltage cable hookup device making use of the same compressed insulators implementing electrical insulation between the different components. This feedthrough comprises two enclosing insulators, one (19*a*) being primary and the other (19*b*) secondary. Each of these enclosing insulators 19*a* and 19*b* is respectively mounted on the primary inner conductor 20*a* of a primary cable 27*a* and on the secondary inner conductor 20*b* of a second cable 27*b*. Obviously too these first and second cables are the ones which shall be hooked up to each other using the feedthrough of the invention. The inner conductors 20*a* and 20*b* therefore must be hooked up to each other, namely by an electrical connection element 21 which in particular may be spherical and may offer two jacks to the inner conductors. Be it borne in mind that the enclosing insulators may be designed in such a way that each may receive a hemisphere at its end.

These primary and secondary enclosing insulators 19*a* and 19*b* are respectively enclosed in turn by primary and secondary shield extensions 22*a*, 23*a* and 22*b*, 23*b*; these primary and secondary shield extensions make contact and are firmly joined to each other, each being electrically connected to the particular cable shield 24*a* or 24*b* with which it cooperates. In a preferred embodiment of the present invention, each of these components consists of two distinct parts: a first part 22*a* or 22*b* may assume a function similar to that described with respect to the primary mechanical fasteners 7, 8, 9 of the wall feedthrough of FIG. 1; the second part 23*a* or 23*b* when in the shown geometry may be likened to the wall 2 of this same feedthrough. In such a case this is then a high-voltage hookup system composed of two mutually assembled devices which are substantially similar to those described above as being wall feedthroughs. In this preferred embodiment the devices are assembled by means of the parts 23*a* and 23*b* of the primary and secondary shield extensions, and assembly being implemented by threads on said parts to firmly join them together.

Exactly as in the case of the above described wall feedthrough, the high-voltage cable hookup device comprises primary and secondary shield extensions respectively 22*a*, 23*a* and 22*b*, 23*b* which must be electrically insulated both from the primary and secondary inner conductors 20*a* and 20*b* and from the electrical connecting element 21. For that purpose compressed electric insulators 25*a*, 25*b*, 26 similar to the compressed electric insulators 4, 10 of the wall feedthrough of FIG. 1 will be used. These compressed electric insulators 25*a*, 25*b*, 26 also are situated at two different sites, namely between each enclosing insulator 19*a* or 19*b* and the inner cable conductor with which it cooperates. As in the embodiment of the wall feedthrough, this part of the compressed electric insulators assumes the shape of a cylindrical stopper exhibiting the same properties as the cylindrical stopper 10 of the wall feedthrough and being compressed the same way. The second part of these compressed electric insulators is situated between the two ends opposite primary and secondary enclosing insulators 19*a* and 19*b* respectively The second part assumes the shape of a washer 26 seated around the electric connection element 21 which in this embodiment is a conducting sphere. This washer 26 too can be likened to the washer 4 of the wall feedthrough of FIG. 1 and exhibiting the same properties. In this embodiment compression is exerted by mutually tightening the primary and secondary shield extensions 22*a*, 23*a* and 22*b*, 23*b*. As already mentioned above, such tightening may be carried out by screwing the elements 23*a* and 23*b* onto each other, the compression being such as that which shall be described in relation to the washer 4 of the wall feedthrough. These compressed electric insulators 25*a*, 25*b*, 26 shall then preclude electric arcing between the various conducting elements of this device.

The procedure to compress the electric insulators 4, 10 in the wall feedthrough is the following:

First, compression takes place at two different levels, and in a different manner in each case.

As regards the washer 4, it shall preferably be received in the flange 16 of the socket 5 and it is compressed by tightening the upstream end 14 of the socket 5 against the wall 2. This tightening is implemented by moving collars 6, 9 towards the wall and thereby pressing the head of the end 14 against this wall 2. As already indicated above, an insulating foil 3 may be inserted between the wall and the upstream end 14.

The other electric insulators consist of the cylindrical stopper 10. This stopper is designed to be seated in the central segment 18 wherein it is then compressed in two consecutive stages. In a first stage, the cylindrical stopper 10 is compressed while being positioned in the borehole of the central segment 18 because its outside diameter is slightly less than the borehole diameter of the central shell 18. In a second stage, the stopper is compressed by the cable's inner conductor 12 being force-fitted into the stopper's own borehole which was drilled before assembly: this drilling is carried out using an appropriate drill bit in order that the borehole diameter be slightly less than that of the cable's inner conductor 12. This manner of insulator compression of course is merely illustrative of many others and shall then result in the desired compression based on precise dimensional parameters of the insulators determined by the expert.

Be it noted that to allow the cable inner conductor to pass through the stopper without degrading it, preferably a base (omitted) is used which shall be mechanically rounded off, smooth and conducting, and which is soldered/welded to the end of the inner conductor.

In order to determine the applicable parameters for the insulators 4, 10, namely the applicable insulator dimensions and the compression magnitude, a number of upstream tests were carried out. The material referred to herein was selected for its mechanical and insulating properties in the applied tests and is a closed-cells silicone sponge commercially known as K495 made by Keeling Rubber & Plastics Ltd.

The test results are listed below.

In a first phase, the research applied to the width of the K495 at a given compression and at a constant thickness of about 6.4 mm before compression. For compressions up to about 60%, the voltage strength increases linearly with insulator length. The purpose of the compression is to fill the roughnesses at the interfaces to preclude electric breakdowns between the various elements, whether insulating or not. This compression thus constitutes protection against breakdown-caused energy release. Illustratively it was noted that in tests at a given insulator's length and thickness (FIG. 7), such an insulator withstood voltages of about 50 kv at a compression of at least 30%. This value of 50 kv is especially significant because the prior art incurs difficulties in attaining satisfactory results beyond this value. The values listed are substantially identical with those for silicone sponge products exhibiting the same technical features.

It was observed during these tests that at compressions larger than 60%, the breakdown voltage no longer varies linearly but as the square root of the insulator's length.

Finally, as regards this series of tests, it was found that the kind of breakdown is independent of the insulator's length. Below a compression of about 60%, breakdowns take place at the surface, whereas above, these surface breakdowns disappear and volume breakdowns arise as the voltage increases.

This 60% barrier was found in the main tests run on K495 and may vary by a few percent with other silicone products of this kind or with different products. Thresholds were noted in this regard which run from about 55 to 65%.

In a second phase, the tests related varying the compression at given lengths of K495 and at constant thickness (about 6.4 mm before compression). The breakdown voltage in this case appears to be an exponential function of compression. As regards the kind of breakdown, and as already noted above, volume breakdowns take place preferentially above a compression of about 55 to 65%, indicating that compression substantially improves dielectric strength.

Obviously these results may be extended to any insulator that would meet the following requirements: appropriate voltage strength, compactness to limit inductance, insensitivity to nature of interface being used.

The materials that were tested to electrically insulate the wall feedthrough both are silicones, namely the above cited K495 and Siloprene 2540: to implement an electric wall feedthrough, it may be necessary to use several dielectric materials as a function of the geometries and environment.

As regards the wall feedthrough above, the very soft K495 was placed as a washer 4 in the flange 16. In this case Siloprene or the like could not be substituted for K495 where the compression required to attain breakdown strength might mechanically rupture the feedthrough. The Siloprene material was used as the cylindrical stopper in a borehole of the central segment 18 because K495 is too compliant to enter the borehole pf about half the diameter.

At the conclusion of these various tests, the preferred parameters relating to connection system withstanding about 100,000 v are the following:

distance from the upstream end 14 to the component 8: 80 mm diameter of the case 18: 25 mm diameter of the upstream end 14: 70 mm the upstream end projects beyond the wall by more than 10 mm.

It was noted that in general the feedthrough's upstream end 14 projects less than 7 mm beyond the wall 2 for a voltage of 50,000 v and less than 10 mm for a voltage of 100,000 V.

It is understood that other insulators may be used to the extent they shall be satisfactory both mechanically and electrically.

Applying a principle substantially similar to the one discussed above, another preferred embodiment relates to a hookup device for high-voltage cables.

Obviously a number of modifications may be introduced by the expert both to the above illustratively and non-restrictively described electric wall feedthrough and to the hookup system without thereby transcending the scope of protection defined by the attached claims.

What is claimed is:

1. A wall feedthrough comprising:

an insulating high-voltage socket mountable to a wall, said socket comprising a central segment, an upstream end and the wall in downstream end, said ends each projecting from the wall in upstream and downstream directions, respectively, said insulating socket for passing therethrough an inner conductor of a cable having a sheathed part;

a plurality of primary mechanical fasteners located at the socket's downstream end for removably cooperating with a plurality of secondary mechanical fasteners affixed to the sheathed part of a cable; and a plurality of compressed electric insulators, wherein said plurality of compressed electric insulators is for A electrically insulating the inner conductor of a cable from the wall.

2. The wall feedthrough according to claim 1, wherein compression of the plurality of electric insulators is at least 30%.

3. The wall feedthrough according to claim 1, wherein a first part of the plurality of compressed electric insulators is located between the socket upstream end and a wall and a second part of the plurality of compressed electric insulators is located between a cable inner conductor and said insulating socket.

4. The wall feedthrough according to claim 1, wherein a foil is interposed between the upstream end of the insulating socket and a wall.

5. The wall feedthrough according to claim 1, further comprising a flange for receiving part of the plurality of electric insulators, wherein said flange is attached to the upstream end of the insulating socket.

6. The wall feedthrough according to claim 1, wherein the plurality of primary mechanical fasteners comprise a metal case affixed to the downstream end of the insulating socket and for removably receiving the secondary mechanical fasteners affixed to the sheathed part of a cable.

7. The wall feedthrough according to claim 1, wherein the primary mechanical fasteners are electrically conducting and comprise electric hookup elements for electrically connecting to a wall, and the secondary mechanical fasteners also are electrically conducting and comprise electric hookup elements for electrically connecting to a cable shield.

8. The wall feedthrough according to claim 1, wherein the insulating socket upstream end is for electrically connecting to an electrically conducting sphere.

9. The wall feedthrough according to claim 1, wherein the compressed insulators are made of silicone-sponge type materials.

10. The wall feedthrough according to claim 1, wherein part of the plurality of compressed electric insulators located between the inner conductor of a cable and the insulating socket is a cylindrical stopper having a borehole opening on both sides thereof, the cylindrical stopper for compression by a cable inner conductor forced into the borehole.

11. The wall feedthrough according to claim 1, wherein part of the insulators located between the insulating socket upstream end and a wall is a washer for compression by tightening the feedthrough against the wall.

12. A wall feedthrough comprising:

an insulating high-voltage socket mountable to a wall, said socket comprising a central segment, an upstream end and a downstream end, said ends each projecting from the wall in upstream and downstream directions, respectively, said insulating socket for passing therethrough an inner conductor of a cable having a sheathed part;

a plurality of primary mechanical fasteners located at the socket's downstream end for removably cooperating with a plurality of secondary mechanical fasteners affixed to the sheathed part of a cable; and a plurality of compressed electric insulators, wherein (1) said plurality of compressed electric insulators is for electrically insulating the inner conductor of a cable from the wall, and (2) a part of said plurality of compressed electric insulators when compressed sustain compressive stresses in a first direction, and a part of said plurality of compressed electric insulators when compressed sustain compressive stresses in a second direction.

13. The wall feedthrough according to claim 12, wherein the first direction is an axial direction of a cable and the second direction is perpendicular to said axial direction.

* * * * *